United States Patent [19]

Böttger et al.

[11] Patent Number: 4,922,968

[45] Date of Patent: May 8, 1990

[54] PREMOLDING CONSISTING OF MULTIPLY FABRIC

[75] Inventors: Wolfgang Böttger, Ködnitz; Kurt Biedermann, Kulmbach, both of Fed. Rep. of Germany

[73] Assignee: Vorwerk & Co. Interholding GmbH, Fed. Rep. of Germany

[21] Appl. No.: 244,112

[22] Filed: Sep. 14, 1988

[30] Foreign Application Priority Data

Sep. 26, 1987 [DE] Fed. Rep. of Germany ....... 3732555
Apr. 18, 1988 [DE] Fed. Rep. of Germany ....... 3812909

[51] Int. Cl.⁵ .............................................. D03D 3/00
[52] U.S. Cl. .............................................. 139/384 R
[58] Field of Search ................... 139/384 R, 387, 390, 139/391, 122, 121; 428/193, 257, 225, 175, 178

[56] References Cited

U.S. PATENT DOCUMENTS

| | | | |
|---|---|---|---|
| 970,906 | 9/1910 | Fisher | 139/390 |
| 3,374,793 | 3/1968 | Young et al. | 139/384 R |
| 3,538,957 | 11/1970 | Rheaume | 139/384 R |
| 3,829,353 | 8/1974 | Fisher | 139/384 R |
| 4,719,837 | 1/1988 | McConnell et al. | 428/225 |
| 4,725,485 | 2/1988 | Hirkawa | 428/257 |
| 4,788,101 | 11/1988 | Sakatani et al. | 139/384 R |

Primary Examiner—Henry S. Jaudon
Attorney, Agent, or Firm—Watson, Cole, Grindle & Watson

[57] ABSTRACT

A multiply fabric which can be used for reinforcement purposes and which has a length dimension, a width dimension and a thickness dimension, includes weft threads extending widthwise of the fabric and warp threads extending lengthwise of the fabric, the warp threads being woven with the weft threads so as to provide, in cross section perpendicular to the width dimension, a central web between opposite end portions, each of the opposite end portions having a central gap that divides each end portion into separated left and right flanges that can be bent apart.

6 Claims, 7 Drawing Sheets

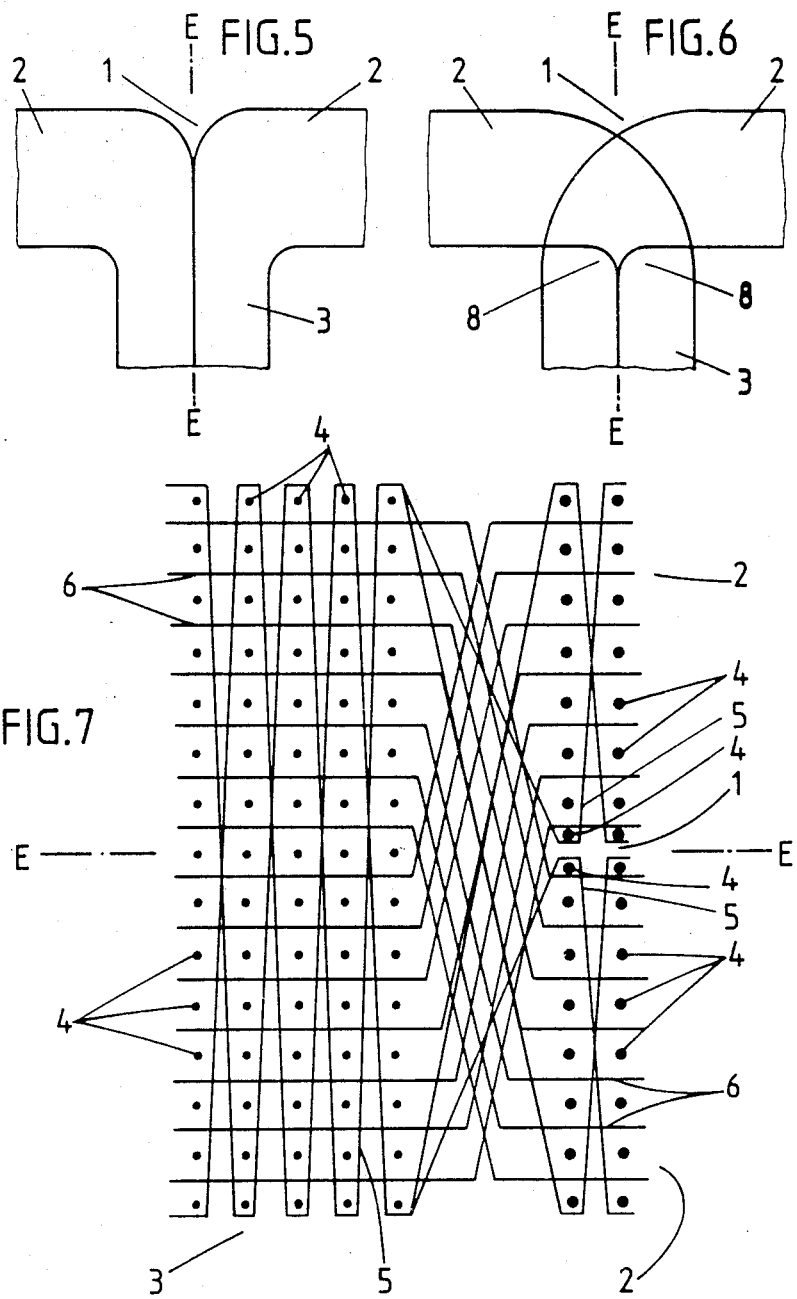

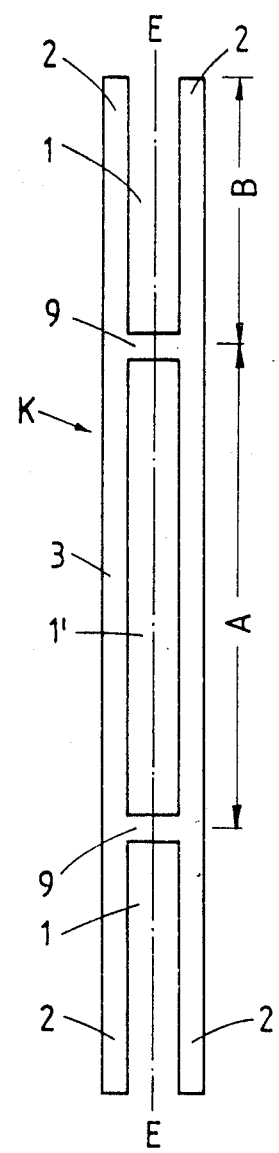
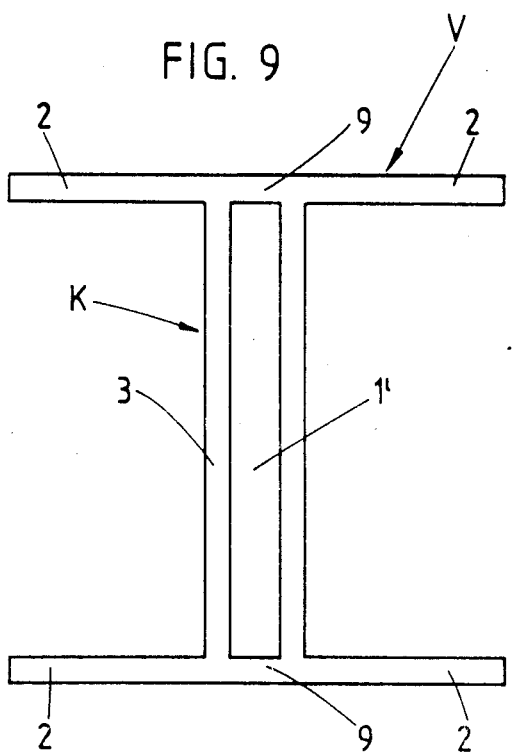
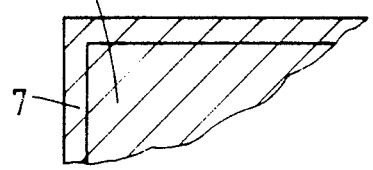

PREMOLDING CONSISTING OF MULTIPLY FABRIC

BACKGROUND OF THE INVENTION

The present invention relates to a premolding consisting of a multiply fabric for use in making fiber-reinforced composite members.

A multiply fabric for the production of fiber reinforced plastic members has been described in the European patent application 0 056 351. The flanges of the fabric may be aligned for the production of a very wide range of sections; this also applies for the web in an analogous manner.

One object of the invention is to devise a multiply fabric of this type for the production of premoldings which, while being simpler to produce, has an internal structure of the multiply fabric which leads to an enhanced strength.

SUMMARY OF THE INVENTION

According to this invention the produced multiply fabric has a length dimension, a width dimension and a thickness dimension, and its weft threads extend widthwise of the fabric and its warp threads extend lengthwise of the fabric, the warp threads being woven with respect to the weft threads to provide the fabric, when viewed in a cross-section perpendicular to its width dimension, with a central web extending between opposite end portions, each of the opposite end portions having a central gap therein that divides each end portion into separated left and right flanges that can be bent apart.

According to the invention the multiply fabric includes a fabric which is made up of weft, warp and stationary threads and includes a gap open towards the ends for the formation of two independently folding fabric flanges, the gap being woven by the curved transition of the warp threads around the central weft threads.

Owing to such a configuration a firm fabric structure is produced. More especially, the material adjacent to the initial part of the gap is strong. There is no distortion of the fabric on being impregnated with plastic. There is enhanced control of the molding operation. Nevertheless the conditions of weaving are simple.

A further disadvantage of the premolding noted is furthermore that the fabric flanges only have half the web thickness since they are true web dividers. Here this loss in thickness of the section is remedied by the addition of reinforcing bars. Such separate bars naturally lead to points of weakness, since they are not weavingly joined with the rest of the multiply fabric.

This shortcoming may be simply remedied by the further development which at the flanges of the fabric the weft threads are respectively arranged in two plies or consist of double thickness weft material or such material in accordance with requirements.

Owing to such a design the invention provides a multiply fabric which has fabric flanges and a fabric web with approximately the same thickness without supplementary pieces of fabric having to be added. Accordingly there is highly satisfactory distribution of the fraction of fiber material in the finished plastic composite member. Naturally a partial variation in the number of weft threads is possible or the thickness of the weft material may be varied for the production of certain special-purpose shapes. To take an example, the number or thickness might be reduced in the fold-over zone as such in order to make folding more readily possible, and more especially to avoid corrugation at the inner corners between the fabric flanges and the fabric web. As has been seen, the double ply structure of the weft threads or the corresponding concentration of material does not lead to any difficulties during impregnation, more especially since impregnation is usually performed in a mold under vacuum, in this case it is practically possible to exhaust the fabric till all air inclusions are removed. The fabric may be composed of technical fibers such as fiberglass, polyyarns, carbon fibers and the like. While in the zone forming the gap the stationary threads as one half of the group continue into one respective fabric flange, in accordance with a further advantageous feature of the invention the design is such that the stationary threads (basic warp threads) of the left hand half of the fabric web at the start of the gap change to the right hand side of the fabric web and vice versa. The result is then a bridged over web division which is extremely resistant to tearing. The web material is thus supported with the formation of a sort of deflector edge by the respective opposite side. All this takes place in an arcuate course, not having a splitting action, of the stationary threads. A further suggestion in accordance with the invention is that at the fabric web there is also a middle gap, which is occluded at both ends by the warp threads extending round from the fabric section of the one side to the fabric section of the respective other side. While still having the advantageous lateral transition from side to side in order to create the bridging transitions this terminal lock of the outwardly open gap is used as the limit of the middle gap in the fabric web. Thus in the center of the I girder composite member a box section is produced with a high internal strength and a homogeneous reinforcement.

The invention will now be described in more detail with reference to three working embodiments as shown in the drawing.

BRIEF DESCRIPTION OF THE DRAWINGS

FIG. 5 is a diagrammatic representation of the V-like division of the web.

FIG. 6 is a diagrammatic representation of a bridging web division, this time in accordance with a second embodiment of the invention.

FIG. 7 shows the weave diagram thereof.

FIG. 8 is an end-on view of multiply fabric in accordance with the third embodiment of the invention with a hollow fabric web.

FIG. 9 is the same end-on view but with the fabric flanges bent outwards so as to form an I section.

FIG. 10 shows part of the corresponding plastic composite member.

DETAILED DESCRIPTION OF THE PREFERRED EMBODIMENTS

The webbing-like premolding V is formed of multiply fabric comprises gaps 1 produced during the process of weaving and cutting and open towards both the narrow edges. The gaps extend in the longitudinal central plane E—E of the webbing and have the same depth.

Figure 2:
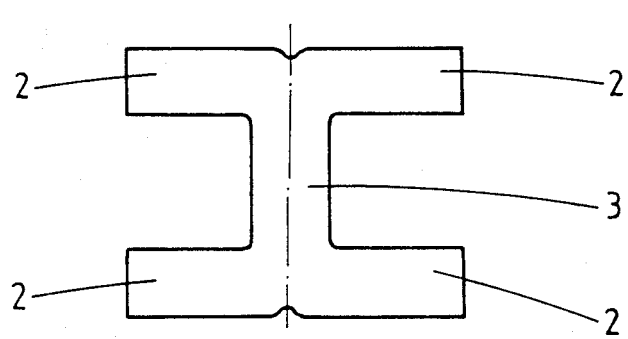
FIG. 2 is an end-on view of this multiply fabric with the fabric flanges in a bent form and with the formation of a I girder shape.

The gap 1 leads to the formation of two respective fabric flanges 2 which are able to be independently folded. The flanges are able to be folded so that they are oblique or perpendicular to the plane E—E after being moved out of the setting aligned in parallel. It is for instance possible to produce the I girder as shown in FIG. 2, in which case the fabric flanges 2 folded back through 90° are in a horizontal position parallel to each other.

Figure 1:
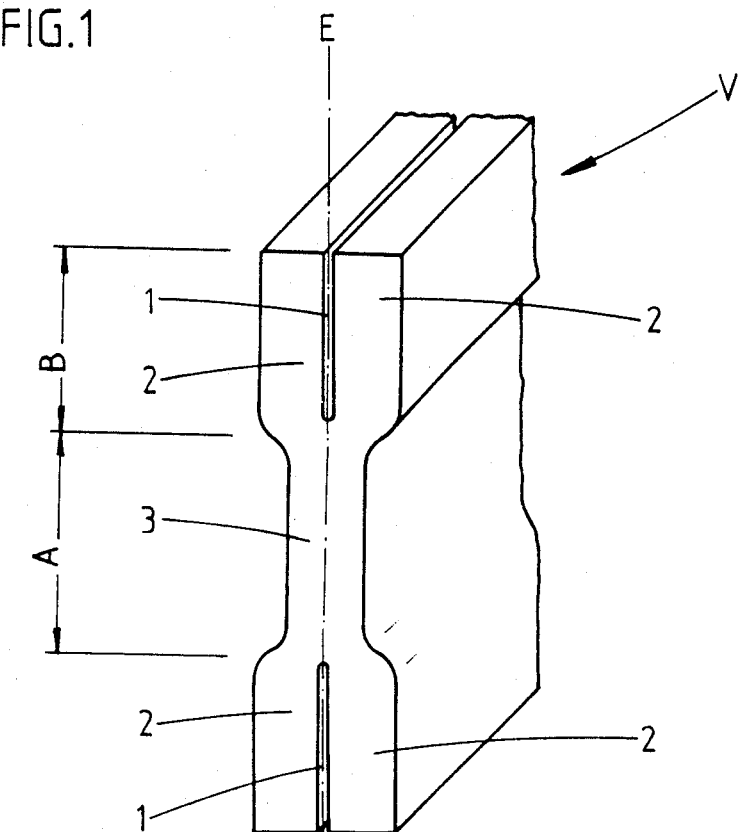
FIG. 1 shows part of a multiply fabric in perspective forming the first working embodiment of the invention.

The fabric flanges 2 and the fabric web 3 connecting them are made with essentially the same thickness. This is possible since the multiply fabric in the fabric flanges 2 has double the number weft threads 4 in the fabric web 3. Such an accumulation of material means that these woven zones project and furthermore that there is accordingly a greater length of the weft threads, as is shown in FIGS. 1 and 2. In order to make things clearer, in the weave diagram of FIG. 4 the corresponding three-dimensional thickening of the fabric flanges 2 is not shown.

This figure also indicates the gap 1, which is produced inasfar as the warp threads 5 are trained around the middle weft threads 4 and therefore do not, as in the part A forming the fabric web 3, extend through the entire woven thickness of the multiply fabric.

The individual plies of the stuffer warp threads 6 binding the multiply fabric extend over the full width of the fabric in a direction parallel to the broad sides of the woven webbing, i.e., floating threads.

In the web-forming part A the stuffer warp threads 6 extend between the individual weft threads 4 and in the part B forming the fabric flanges 2 between the respective weft threads 4 arranged in pairs. In this respect the ends of the fabric web 3 are divided inasfar as the fabric at the "seam" spreads out practically in the form of a letter V. The one half of the stuffer warp threads 6 extend as a continuation into this fabric flange 2 rooted in this same half and that of the other half extend into the respective fabric flange 2. The limit of division is in the longitudinal middle plane E—E. In the longitudinal plane E—E there is a double-ply weft thread binding or connection so that if there is an even number of weft threads 4 there will be a symmetrical configurationn in the web zone.

Figure 4:
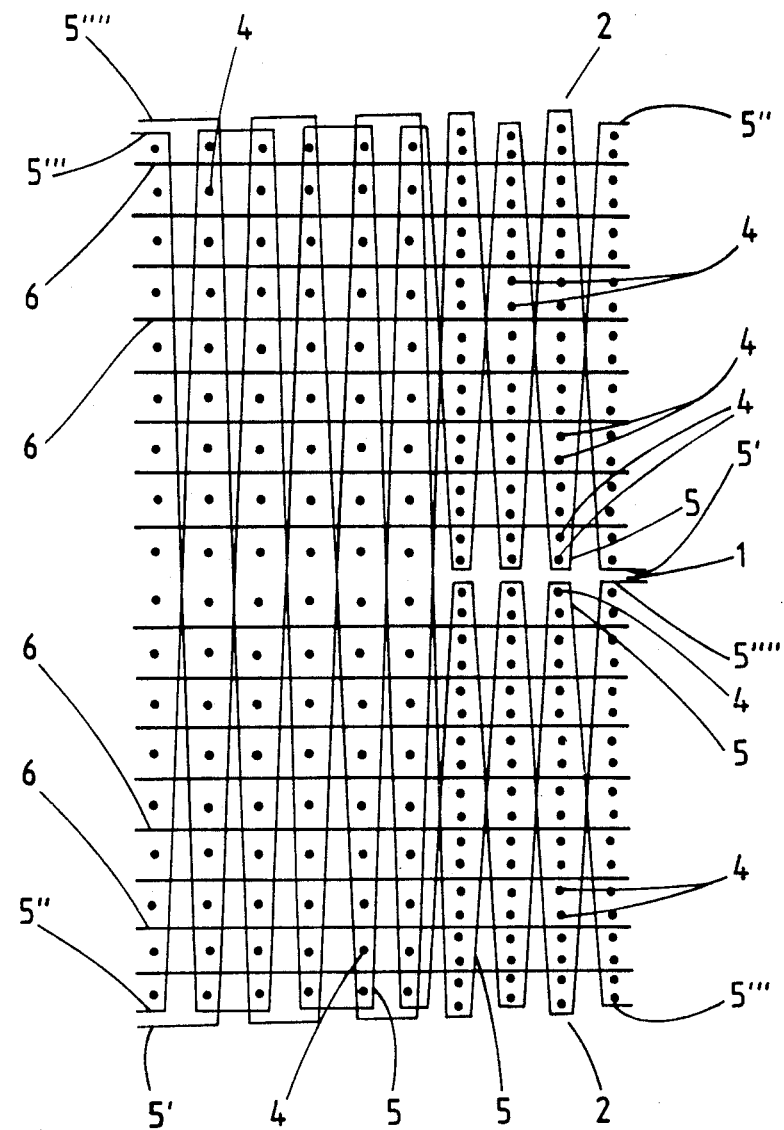
FIG. 4 is a substantially diagrammatic weaving diagram of the multiply fabric.

Taking into account the weave pattern in accordance with FIG. 4, the binding threads 5' and 5" beginning on the bottom left in FIG. 4 pass into the fabric flange 2 on the top right and the binding warp threads 5''' and 5'''' beginning at the top left extend into that on the lower right or vice versa. The intersecting ply transition substantially takes place in each case in the middle of the fabric flange or in the middle of the web flange.

Figure 3:
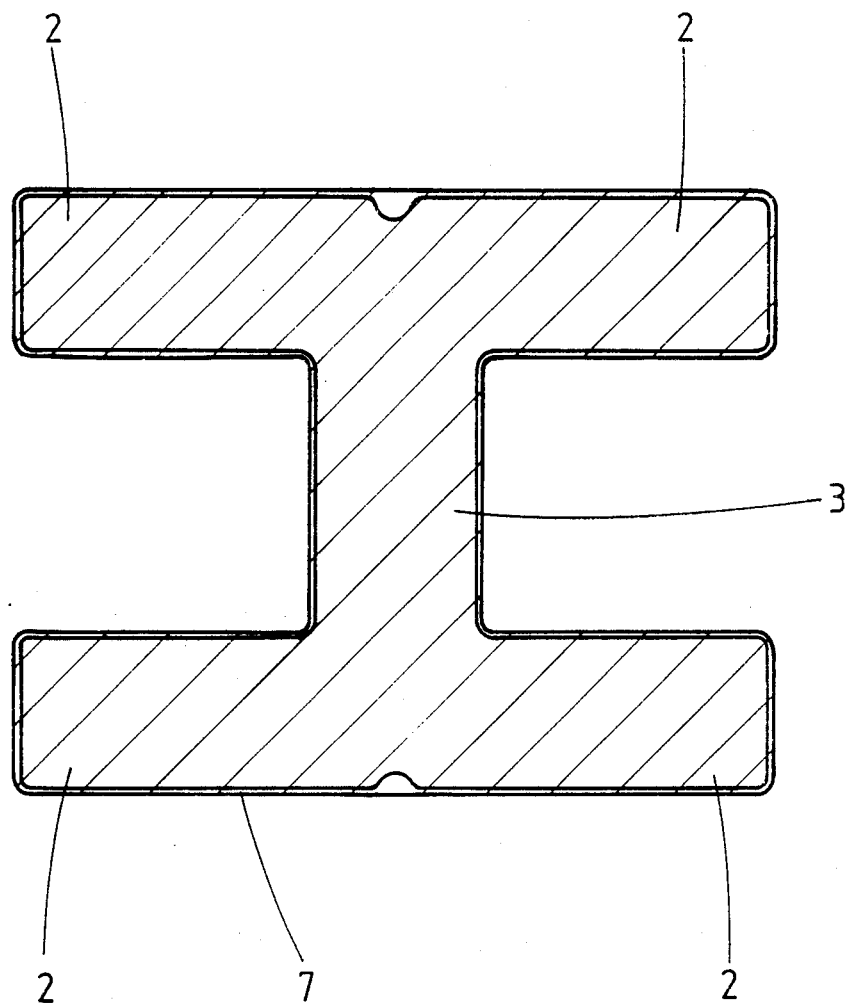
FIG. 3 shows the same configuration in the form of a plastic composite member but on larger scale than in FIG. 2.

The finished plastic composite member is seen in FIG. 3. The multiply premolding V is embedded here so that the plastic forms the outer surface thereof. The external layer of the plastic rooted in the entire multiply fabric and of the cured plastic completely impregnating the same is referenced 7.

The multiply fabric shown in the second embodiment of the invention is of principally the same structure as regards the modification of the thickness of the fabric flanges. It is only the root zone between the fabric web 3 and the adjoining flanges 2 that there is difference in binding technique. The reference numerals are used analogously without repeating the text in all cases.

FIG. 5 (showing the first working example) taken along the longitudinal middle plane E—E to be regarded as the plane of symmetry, diagrammatically represents the division of the web 3 into a right and a left half. At this position the half groups of the stuffer warp threads 6 split up so that they are continued in the fabric flanges 2.

In the diagrammatic view of FIG. 6 (as the second working example) there is on the other hand such a division of the web that the stuffer warp threads 6 of the left hand half of the fabric web 3 at the start of the gap 1 extend into the right hand fabric flange 2 with a complete transfer to the right hand side of the fabric web 3. In a corresponding manner there is a transition of the stuffer warp threads 6 of the right half of the fabric web 3 at the beginning of the gap 1, changing over to the left hand side of the fabric web 3, to the left fabric flange 2. This transition leads to a bridging over base or beginning of the fabric flanges 2. The stuffer threads 6 extend in a relatively large arc into the respective flange side. This does not lead to a diverging gap but rather to a transition with a converging root part with such an effect that the one group of stuffer threads 6 is supported on the other web should 8 and vice versa. There is a bundling effect in the root part or intersection part of the fabric web 3 and in the fabric flanges 2. Sharp bends are avoided. The reinforcement of the finished plastic composite member is found to be particularly satisfactory.

As may be seen from the weave diagram of FIG. 7, the transition part between the fabric web 3 and the fabric flanges 2 has been pulled apart somewhat in order to make the drawing clearer so that the run or direction of the threads is clearer. Since in this case there is furthermore an odd number of weft threads 4, there is no double-ply binding adjacent to the longitudinal plane E—E, as will be seen from FIG. 4. In place of a double-ply form of the weft threads 4 in the part B forming the fabric flanges a double thickness of the weft material or a thickness great enough to fulfill the requirements is utilized, this having been indicated by the use of larger dots.

Moreover this weave diagram indicates the form of the stuffer warp threads changing over from side to side.

The third form of the invention as indicated in FIGS. 8 through 12 differs mainly from the embodiments so far described inasfar as there is in this case as well a middle gap 1' produced by weaving adjacent to the fabric web 3. This gap 1' is however closed at both ends. The fabric web 3, which in this case has two plies, cooperates with its spaced parallel web walls and the flange parts 9 transverse in relation thereto in forming a centrally placed box girder K. At the outer ends of the horizontally extending flange parts 9 there is a continuation formed by the fabric flanges 2 having the same wall thickness as the web walls. The length of such flanges 2 measured in the extending direction is approximately equal to half the height of the double walled fabric web 3.

The closing part of the middle fabric web gap 1' is in FIGS. 7-11 produced during weaving by a group of stuffer warp threads 6 extending round from the fabric part of one side to the fabric part on the respective other side, plus the binding warp threads 5. This intersecting transition thus leads to a configuration such that the threads contributing to the fabric flanges 2 produce the two fabric flanges 2 on the one side of the longitudinal middle plane E—E of the webbing or girder with their ends and the wall remote from this side of the fabric web 3 and vice versa. The respective transition produced by the weaving technique will be clearly seen from the weave diagram of FIG. 11. Inasfar as they are needed for comprehension, reference numerals are used but the explanations of them are not repeated in the text. This weave diagram is comparable with that of FIG. 7 with the exception of the fact that the gap 1' in the web forming part takes up the space in place of the part used in FIG. 7.

Figure 11:
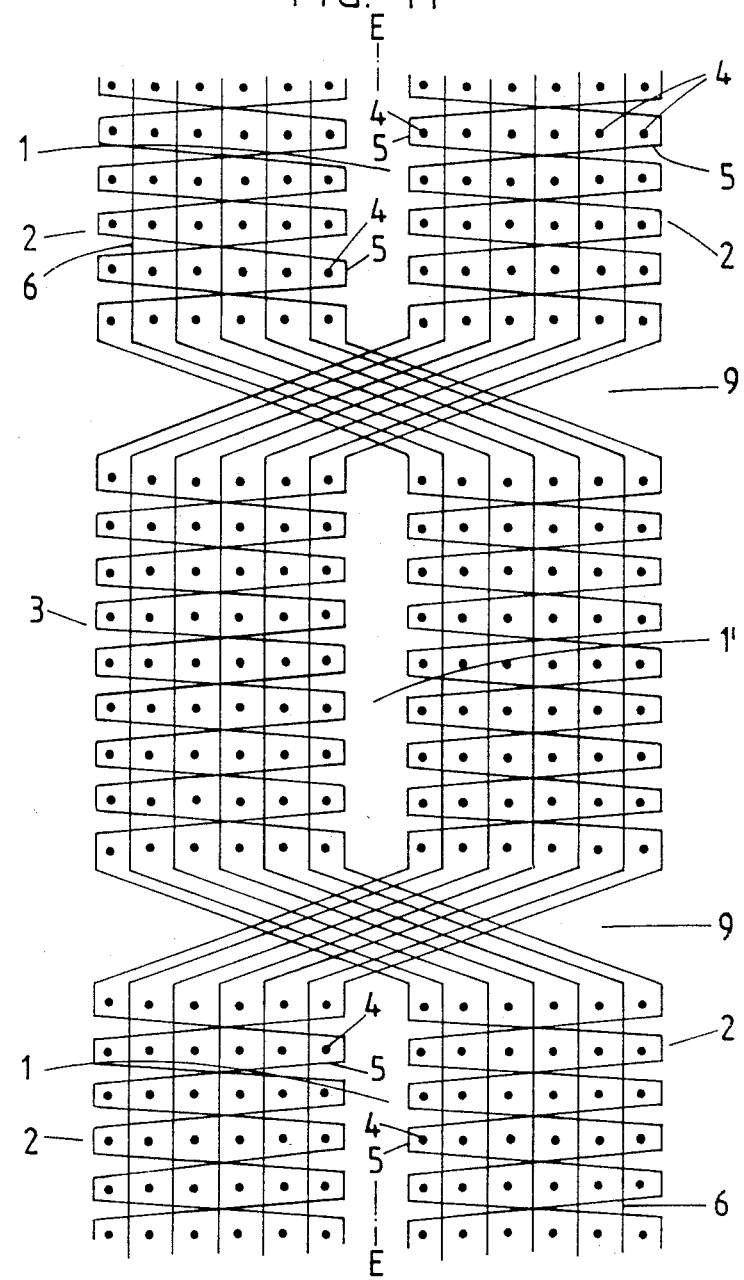
FIG. 11 shows the weave diagram thereof.
Figure 12:
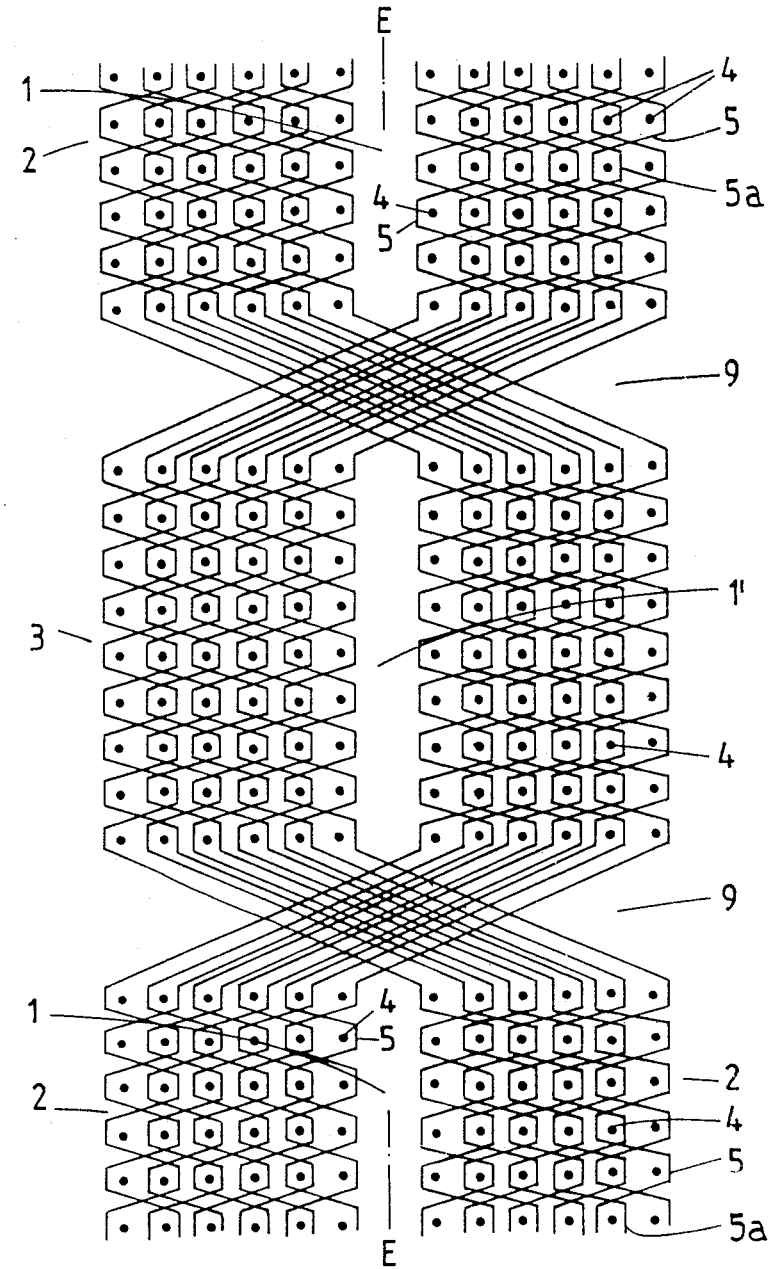
FIG. 12 shows a modified weave diagram constituting the third embodiment of the invention.

The weave diagram of FIG. 12 represents a modified form of the weave of FIG. 11 since the binding of the weft threads 4 is due to the outer binding warp threads 5 and the inner binding warp 5a alternating between the plies. In each case directly adjacent plies of the weft threads 4 are alternately gripped.

The weave diagrams of FIGS. 11 and 12 also serve to indicate that the wall thicknesses of the fabric web 3 are the same as those of the fabric flanges 2, with the difference however that there is the bridging or interlaced transition of the threads of the fabric flanges.

We claim:

1. A multiply fabric for use as a reinforcement in plastic composite members, said fabric having a length dimension, a width dimension and a thickness dimension and being formed of weft threads which extend widthwise said fabric, warp threads which extend lengthwise said fabric, and stuffer warp threads which also extend lengthwise said fabric, said weft threads and said stuffer warp threads being also arranged in a plurality of aligned rows extending in the thickness dimension of said fabric, said warp threads being woven with respect to said weft threads so as to provide said fabric, when viewed in a section perpendicular to said width dimension, with a central web and a first end portion, said first end portion having a central gap therein that divides said first end portion into separated left and right flanges.

2. A multiply fabric according to claim 1, wherein said fabric includes a second end portion, said central web extending between said first and second end portions, said second end portion having a central gap therein that divides said second end portion into separated left and right flanges.

3. A multiply fabric according to claim 2, wherein as many weft threads are present in said first and second end portions as in said central web, such that each flange has a dimension in the thickness dimension of the fabric equal to a dimension of said central web in the thickness dimension of the fabric.

4. A multiply fabric according to claim 2, wherein, when viewed in a section perpendicular to said width dimension, said central web has a left portion and a right portion and wherein the stuffer warp threads extending through said left portion of said central web extend into the right flange of each end portion and the stuffer warp threads in said right portion of said central web extend into the left flange of each end portion.

5. A multiply fabric according to claim 2 wherein, when viewed in a section perpendicular to said width dimension, said central web has a left portion and a right portion and wherein the stuffer warp threads extending through said left portion of said central web extend into the left flange of each end portion and the stuffer warp threads extending through said right portion of said central web extend into the right flange of each end portion.

6. A multiply fabric according to claim 2, wherein said warp threads are woven with respect to said weft threads such that said central web, when viewed in a section perpendicular to said with dimension, has a central gap therein.

* * * * *